Feb. 22, 1938.   D. F. FESLER   2,109,108
KNIFE
Filed Aug. 19, 1935
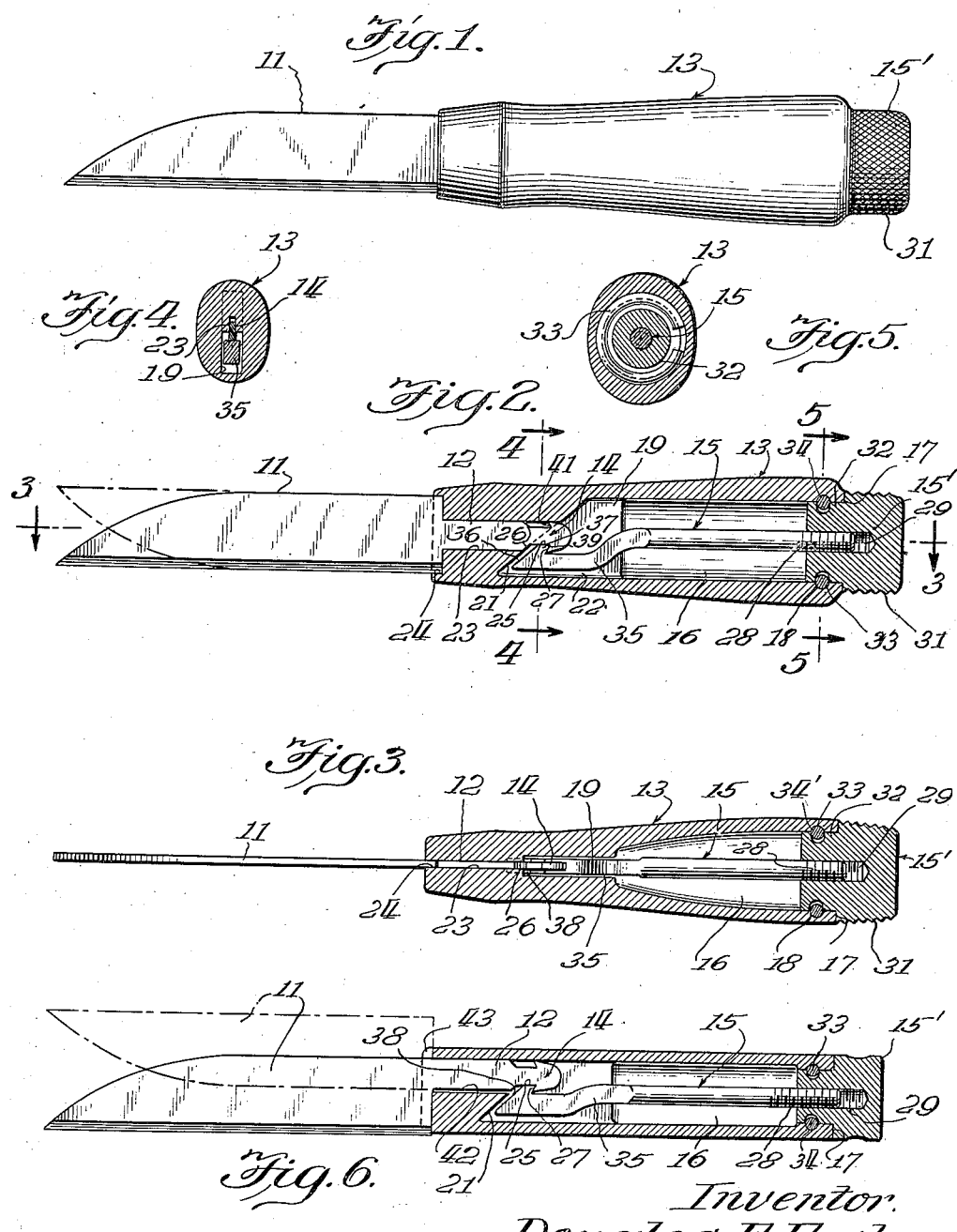
Inventor.
Douglas F. Fesler.
By Williams, Bradbury,
McCaleb & Hinkle Attys.

Patented Feb. 22, 1938

2,109,108

UNITED STATES PATENT OFFICE 2,109,108

KNIFE

Douglas F. Fesler, Woodstock, Ill.

Application August 19, 1935, Serial No. 36,784

2 Claims. (Cl. 30—337)

This invention relates to knives, and has for an object the provision of a novel and an improved knife with a blade which is replaceable in the sense that it may be releasably attached to the knife handle, separated therefrom, and re-attached thereto or replaced by another blade.

Another object of the invention is the provision of such a knife wherein the blade is capable of attachment to the handle with the cutting edge facing a desired direction or the opposite direction, to suit the character of the work to be done and to facilitate attaching the handle and blade together when replacing the blade.

A further object of the invention is the provision in a replaceable blade knife of a handle so formed as to enclose therein the blade retaining means, and to provide guide means in and integral with the handle for cooperating with means operable from outside of the handle to move the blade retaining means to and from blade retaining position in the handle.

Another object of the invention is the provision in a replaceable blade knife of such a handle which may be die or pressure cast, and may therefore be accurately duplicated whereby to promote uniformity in construction and manufacture of such knives without incurring the expense of machining operations.

Other objects and advantages of my invention will appear more fully from the following description and from the accompanying drawing, in which similar characters of reference indicate similar parts throughout the several views.

Figure 1 is a plan view of a replaceable blade knife embodying the features of the invention;

Figure 2 is a longitudinal cross section of the novel knife showing the blade releasably attached to the handle;

Figures 3, 4, and 5 are cross sections respectively taken substantially along the lines 3—3; 4—4; and 5—5 of Figure 2, and showing certain construction and assembly details of the knife of the invention; and Figure 6 is a cross section similar to that of Figure 2, showing a slightly different handle formation.

Illustrative of the invention, a blade 11 with a tang portion 12, and a handle 13 are separably or releasably assembled or connected together to provide a paring knife by the cooperation or coaction of connecting or coupling means 14 on the tang portion and blade retaining means or cap 15 in the handle, the blade retaining means 15 being operatively connected with a handle closure member 15' rotatably secured in the butt or rear end of the handle and adapted to actuate the blade retaining means 15.

In order to obviate expensive and laborious machining, assembling, and finishing operations, but nevertheless to provide a knife handle with accurately positioned and shaped members and surfaces for releasable or separable connection with a knife blade, the handle 13 is preferably formed by die or pressure casting as a unit or for assembly as a unit.

With that end in view, the handle 13 is formed with a hollow end portion 16 and open at its rear end 17. In side and near the end of the hollow portion 16, the handle is provided with an annular groove 18. Forwardly of and adjacent the hollow handle portion 16, the handle is formed to provide a relatively narrow passage 19 which has a forward wall or camming surface 21 at an inclination to the longitudinal axis of the handle and serving as a cam or guiding means for the blade retaining means 15, and which has a side wall 22 for limiting the movement of the blade retaining means 15 in one direction.

Communicating with the relatively narrow passage 19 through the inclined forward wall 21 thereof is a tang receiving passage 23 which is formed in and longitudinally of the handle, and which communicates with a slot 24 formed in the forward end and transversely of the handle. The dimensions of the tang receiving passage 23 and the slot 24 are such that the tang portion 12 may be inserted therein and moved inwardly of the handle until the rear end of the blade proper engages in the transverse slot 24. At that position the connecting or coupling means 14 on the tang portion 12 extends into the relatively narrow passage 19 between the inner ends of the hollow handle portion 16 and the tang receiving passage 23.

That coupling means 14 on the tang portion 12 is illustrated as being a slot or notch 25 so cut or otherwise formed in the marginal edge of the tang portion corresponding to the cutting edge of the blade proper as to provide a forward slot wall or end 26 and a rear slot wall or end 27 of substantially the same inclination to the longitudinal axis of the blade 11 or tang portion 12 as that of the wall 21 to the longitudinal axis of the handle. The slot 25 is formed in the tang portion 12 at such a position that the forward wall 26 of the slot will be flush with the forward inclined wall 21 of the passage 19 when the tang portion 12 is inserted into the tang receiving passage 23 for attaching the blade to the handle.

For releasably holding the tang portion 12 in the tang receiving passage 23, the blade retaining means 15 is constructed in the form of a resilient elongated member connected at one end to the closure member 15' and extending longitudinally of the handle through the hollow portion 16 to adjacent the forward wall 21 of the relatively narrow passage 19. That resilient elongated member is externally threaded at its rear end 28 for threading engagement in an internally threaded recess 29 formed in the closure member 15'. The closure member 15' has a knurled outer end 31 terminating centrally thereof at a shank portion 32, and is rotatably secured in the open end 17 of the handle by a resilient split ring 33 engaging in an annular external groove 34 in the shank portion 32 of the closure member.

At its forward end the resilient elongated member 15 is provided with an offset portion 35 having its forward end 36 beveled or inclined for guiding engagement with the inclined forward wall 21 in the relatively narrow passage 19. The offset portion 35 is formed with a lug or projection 37 having its forward end or wall 38 and its rear end or wall 39 inclined similarly to the walls 26 and 27 respectively of the slot 25, into and from which the lug 37 is movable by the coacting inclined walls 21 and 36 during the movement of the resilient elongated member 15 by the closure member 15'.

If desired, the tang portion 12 in the marginal edge opposite that having the slot 25 may be formed to provide a slot 41 like the slot 25 for cooperation with the lug 37 in releasably connecting the blade to the handle with the blade edge facing in the opposite direction from that illustrated in Figure 2. As shown more particularly in Figure 6, the slots 25 and 41 in opposite marginal edges of the tank portion 12, besides facilitating the assembly of the knife by providing for the releasable connection with the blade edge facing either direction, enable me to provide a knife wherein the cutting edge at the rear end of the blade does not extend outside of the peripheral surface or plane of the handle (see full line view in Figure 6), or wherein the blade may, as shown in broken lines in Figure 6, extend transversely beyond the peripheral surface or plane of the handle. Thus the knife may be adapted to the operation to be performed. To accomplish that, the handle is formed with the tang receiving passage 42 at a side of the handle and with its transverse slot 43 extending through the wall at the same side of the handle.

With the threaded end 28 of the resilient elongated member 15 engaging in the threaded recess 29, and with the split ring 33 in the groove 34, the assembled elongated member and closure member are inserted in the open end 17 of the knife handle and moved forwardly until the compressed ring 33 in the groove 34 registers with the groove 18 in the hollow handle portion. The ring 33 then expands and rotatably locks the closure member 15' in place.

Turning the closure member 15' in one direction will cause the coacting threads 28 and 29 to urge the resilient elongated member forwardly, whereby the inclined walls 21 and 36 will move the offset portion 35 of the resilient member toward the limiting wall 22 of the relatively narrow passage 19 to disengage the lug 37 from the slot 25 or the slot 41. The width of the passage 19 prevents the resilient elongated member from rotating during the operation thereof by the closure member 15'.

The blade 11 may thus be removed or detached from the handle. The same or a different blade may be releasably connected to the handle by inserting the tang portion in the tang receiving passage and moving it inwardly until the rear end of the blade proper is seated in the transverse slot 24 or the transverse slot 43. The closure member 15' is then turned in the opposite direction from that just described above, thereby retracting the resilient member 15. The resiliency of the member 15 tends to cause it to spring away from the limiting wall 22 of the relatively narrow passage 19 during that retractive movement, and the inclined walls 21 and 36 coact to guide the lug 37 to engagement in the slot 25 or the slot 41 in the tang portion for locking the blade in place.

While the invention has been described and illustrated in connection with a paring knife, it will be understood that the invention may be embodied in other types of knives and utensils and is not, therefore, limited to the illustrated embodiment but contemplates such changes and modifications as may come within the spirit and scope of the appended claims.

I claim:

1. A knife comprising a blade having a tang portion, a resilient elongated member interlockably engageable with and disengageable from said tang portion, a die cast handle encasing said resilient elongated member and having a tang receiving passage, a manually engageable cap outside of said handle connected with said resilient member for reciprocating said resilient elongated member longitudinally in said handle, and a cam cast in said handle for guiding said elongated member to and from interlocking engagement with said tang portion when said resilient elongated member is reciprocated by said cap outside of said handle.

2. In a detachable blade knife, the combination of a blade having a tang with a notch near its end, a handle having a socket conformed to receive the tang of said blade and hold it against rotation relative thereto, a resilient member for holding said blade against withdrawal from said handle, said member having a hook at one end engageable with the notch in said tang and having a thread formed at its other end, a manually engageable nut swiveled to said handle and screwed on the threaded end of said resilient holding member, means in said handle to prevent rotation of said member, and a cam surface formed within said handle and operable to disengage the hook portion of said member from said notch when said member is forced into said handle by turning said nut relative thereto.

DOUGLAS F. FESLER.